United States Patent Office 3,736,317
Patented May 29, 1973

3,736,317
2,2 - DIMETHYL-6,7α-DIFLUOROMETHYLENE-20-SPIROX-4-ENE-3-ONES OR 3-OLS AND ACYL ESTERS THEREOF
Glen E. Arth, Cranford, and Gary H. Rasmusson, Watchung, N.J., assignors to Merck & Co., Inc., Rahway, N.J.
No Drawing. Filed July 28, 1971, Ser. No. 167,017
Int. Cl. C07c 173/06
U.S. Cl. 260—239.55 R   2 Claims

ABSTRACT OF THE DISCLOSURE 2,2 - dimethyl-6,7α-difluoromethylene-20-spirox-4-ene-3-ones and the corresponding 3-ols and their acyl ester derivatives are provided which have antiandrogenic activity.

The present invention relates to novel compounds of the following formulae:

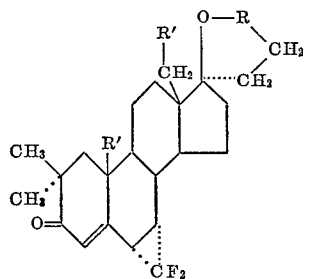

I wherein R' represents methyl or hydrogen, and R represents methylene (—CH$_2$—) or keto (>C=O).

In addition, this invention relates to novel compounds of Formula I in which the 3-keto group is reduced to the 3-ξ-ol and can also be acylated to the 3-ξ-acyl ester of the steroid. Preferably, the lower-alkanoyl (C=1-6) esters of the 3-ξ-ol steroids are prepared.

The novel compounds of this invention are specific androgen antagonists which are useful as therapeutic agents to treat hyperandrogenic disorders. They are particularly useful in the treatment of acne resulting from hyperandrogenicity. They can be administered orally, subcutaneously, or topically in suitable formulations. For example, a hydrophilic ointment suitable for topical application containing 5% by weight of 2,2-dimethyl-6,7α-difluoromethylene-20-spirox-4-ene-3-one in a dipropylene glycol and polyethylene glycol carrier can be prepared by mixing the warm components and cooling. Ointments can be prepared having 0.5–20% by weight of the steroid compound.

A cream-type preparation can also be prepared as a carrier for the active ingredient. A polyethylene glycol (MW=200–300) containing 6% of 2,2-dimethyl-6,7α-difluoromethylene - 20-spirox-4-en-3-one is mixed together with benzyl alcohol, benzylbenzoate, and sodium stearate. A translucent viscous cream results. Creams of this nature can be prepared having 3–20% by weight of the desired steroid.

The active compounds of this invention can also be mixed into pharmaceutical compositions as solid ointment sticks molded into the desired shape or lotions. The latter can be oil-in-water or water-in-oil base type suspensions, using waxes and esters which are non-toxic and generally used in the art.

Certain of the novel compounds of the present invention are prepared according to the following process (Flow Sheet I):

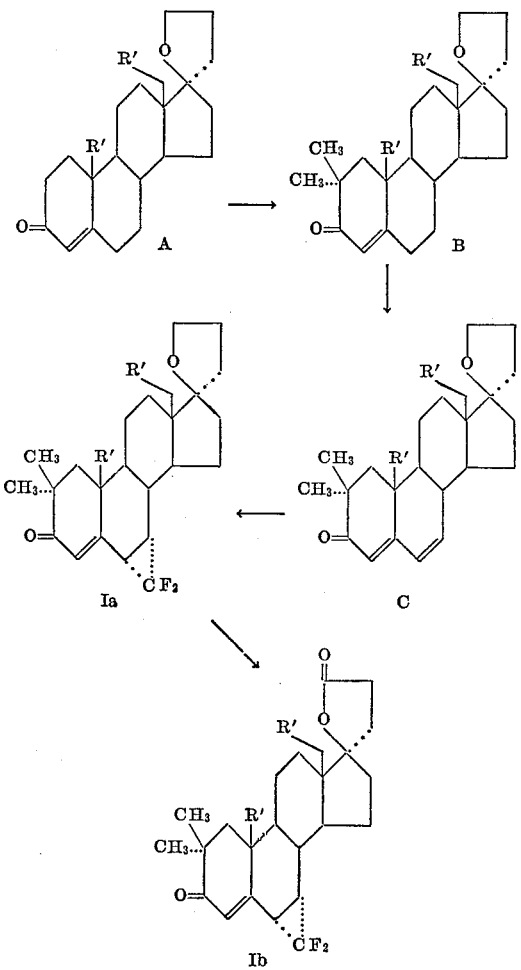

FLOW SHEET I

The starting materials are 20-spirox-4-en-3-one, Compound (A). This material can be prepared following the procedure disclosed in U.S. Pat. 3,254,074.

The process that results in the novel compounds of this invention involves, first, the 2,2-dimethyl substitution in the A ring of Compound (A), and then the introduction of a 6:7 double bond in Ring B of the resultant steroid. The 6:7 double bond can then be substituted with the difluoromethylene group to form Compound (Ia). The latter can then be oxidized at position 21 to form the spirolactones of Compound (Ib); the preparation of Compound (Ia), (2,2-dimethyl-6,7α-dihalomethylene-20-spirox-4-en-3-one), Compound (A), (20-spirox-4-en-3-one), is reacted with methyl iodide and potassium t-butoxide in an organic solvent at —70° C. The temperature can desirably be between —50° C. and —80° C. The reactants are employed in approximately equimolar amounts, and the reaction goes to completion in less than about 2 hours. The compound prepared is Compound (B), 2,2-dimethyl-20-spirox-4-en-3-one. This latter compound is then treated with chloranil using known procedures to introduce a 6:7 double bond in Ring B, thereby forming Compound (C). The latter is then reacted in an organic solvent with chlorodifluoro alkali metal acetate of the formula

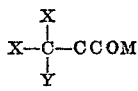

wherein M can be sodium, potassium, or the like, Y is chloro, and X is fluoro. The molar ratio of Compound (C) to the haloacetate is used. The temperature of the reaction is 150–250° C., and preferably at 180–225° C. The reaction takes place in a 1–5 hour period and generally within about 2–3 hours.

The organic solvent can be any solvent which is nonreactive in the presence of the two main reactants. Preferably, it is freshly distilled, or at least free from dissolved oxygen impurities. Suitable solvents include diethylene glycol dimethylether, and triethylene glycol dimethyl ether.

The compound thereby produced is that of Formula Ia, a 20-spiroxenone. The spirolactones of Formula Ib can be prepared directly from Formula Ia by using t-butyl chromate as an oxidizing agent, a process described in a publication in Tetrahedron Letters No. 58, pp. 5057–5059, 1970.

The compounds of both Formulas Ia and Ib are described as the 3-one derivatives. These can be reduced using sodium borohydride, lithium tri-t-butoxy aluminum hydride or lithium aluminum hydride, thereby preparing the analogous 3-ol derivatives. The latter can then be acylated, for instance with acetic anhydride in pyridine, thereby preparing the acetyl derivative. Preferably, the loweralkanoyl esters are prepared having 1–6 carbon atoms in the ester moiety.

The following examples illustrate some specific embodiments of the invention.

EXAMPLE 1

2,2-dimethyl-20-spirox-4-en-3-one 500 mg. of 20-spirox-4-en-3-one and 4.6 ml. of distilled methyl iodide (10 mmoles) are dissolved in dry THF (1 ml.) at —70° C. (Dry Ice/acetone). To the mixture is added a solution of 940 mg. (8.4 mmoles) of potassium-t-butoxide in 5 ml. THF dropwise with stirring, and stirring continued for one hour. The mixture is then diluted with water, extracted with ether, washed with water, dried and evaporated, yielding 47 mg. of a white crystalline powder, identified as 2,2-dimethyl-20-spirox-4-en-3-one.

EXAMPLE 2

2,2-dimethyl-20-spirox-4,6-dien-3-one

One g. of the compound prepared in Example 1, 2,2-dimethyl-20-spirox-4-en-3-one, is dissolved in 40 ml. of t-butanol and 3 g. of chloranil added. After heating at reflux for 180 minutes, the reaction is quenched, and the product, 2,2-dimethyl-20-spirox-4,6-dien-3 - one, λmax. 284 mµ, εmax. 26,000, is recovered by the method described in JACS 82, 4293 (1960).

EXAMPLE 3

2,2-dimethyl-6,7α-difluoromethylene-20-spirox-4-en-3-one

One gram of 2,2-dimethyl-20-spiroxa-4,6-dien-3-one is dissolved in 5 cc. of triethylene glycol dimethyl ether (distilled from LiAlH$_4$). Six g. of chlorodifluorosodium acetate (dried) in 50 cc. of dry triethylene glycol dimethylether is added dropwise over a two hour period while keeping the reaction at 195–200° C. with constant stirring. The reaction mixture is poured over ice, and extracted with ether. The ether extracts are washed with water and dried. The crude reaction product is adsorbed on a 100:1 silica gel column, first with benzene then with increasing percentages of ether in benzene. The product, 2,2-dimethyl-6,7α-difluoromethylene-20-spirox - 4 - en-3-one is recrystallized from heptane.

EXAMPLE 4

2,2-dimethyl-6,7α-difluoromethylene-20-spirox-4-en-3,21-dione 200 mg. of the compound prepared in Example 2, 2,2-dimethyl-6,7α-difluoromethylene - 20 - spirox-4-en-3-one, is dissolved in 4 ml. of carbon tetrachloride, and treated with 2.8 ml. of t-butylchromate, prepared as described in Tetrahedron Letters 58, pp. 5057–5059, 1970, 0.8 ml. of glacial acetic acid, and 0.4 ml. of acetic anhydride. The mixture is refluxed for 3 hours, and the course of reaction followed by thin-layer chromatography. The reaction mixture is cooled and treated with saturated aqueous oxalic acid solution until no gas is evolved. The crude product is separated by chromatography on silica gel, and the desired lactone eluted in increasing quantities of ethylacetate in benzene. The final compound is identified as 2,2-dimethyl-6,7α-difluoromethylene - 20 - spirox-4-en-3,21-dione.

EXAMPLE 5

2,2-dimethyl-6,7α-difluoromethylene-3-hydroxy-20-spirox-4-ene 2.0 gm. of 2,2-dimethyl-6,7α-difluoromethylene-20-spirox-4-en-3-one is dissolved in 25 cc. of methanol and cooled to —15° C. in a methanol-ice bath with stirring. 1.0 gm. of sodium borohydride is added in small portions and the mixture allowed to stir for two hours while keeping the temperature below 0° C. After 2 hours, 4 cc. of glacial acetic acid is added and the reaction mixture is diluted with 100 cc. of water. The mixture is concentrated under reduced pressure on a water bath, then diluted with water and allowed to crystallize. It is then filtered, washed with water, and pumped dry. Following recrystallization from methanol and purification using thin-layer chromatography, 2,2 - dimethyl-6,7α-difluoromethylene-3-hydroxy-20-spirox-4-ene, is recovered.

EXAMPLE 6

2,2-dimethyl-6,7α-difluoromethylene-3-acetoxy-20-spirox-4-ene

Using the 2,2 - dimethyl-6,7α-difluoromethylene-3-hydroxy-20-spirox-4-ene prepared following the procedure of Example 5, 1.523 gm. of the steroid is dissolved in 8.3 cc. of pyridine by warming on a steam bath. Four cc. of acetic anhydride is added and the solution is warmed on a steam bath for 10 minutes. The reaction mixture is poured into 100 cc. of ice when the crystalline product separated. The crystals are filtered off, washed thoroughly with H$_2$O and pumped dry. The product, 2,2-dimethyl-6,7α-difluoromethylene-3-acetoxy-20-spirox - 4 - ene, is recovered after purification by crystallization from methanol.

What is claimed is:

1. 2,2 - dimethyl - 6,7α - difluoromethylene-20-spirox-4-en-3-ones of the following formula:

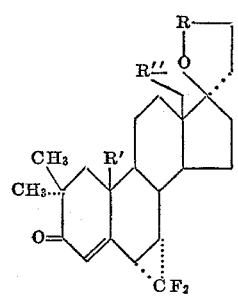

in which R' is methyl or hydrogen, R" is hydrogen, and R is methylene (—CH$_2$—) or keto (>C=O).

2. 2,2 - dimethyl - 6,7α - difluoromethylene-20-spirox-4-en-3-ols of the following formula:
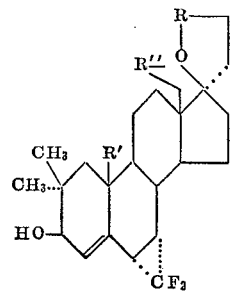
in which R' is methyl or hydrogen, R" is hydrogen, and R is methylene or keto; and the 3-loweralkanoyl esters thereof.
References Cited
UNITED STATES PATENTS
3,338,928   8/1967   Beard et al. _____ 260—397.4
3,356,677  12/1967   Beard et al. _____ 260—239.55
HENRY A. FRENCH, Primary Examiner
U.S. Cl. X.R.
260—239.57, 999